Aug. 23, 1927.
A. D. SMITH ET AL
1,640,223
PROCESS OF TREATING HEAVY HYDROCARBONS
Filed Jan. 28, 1922
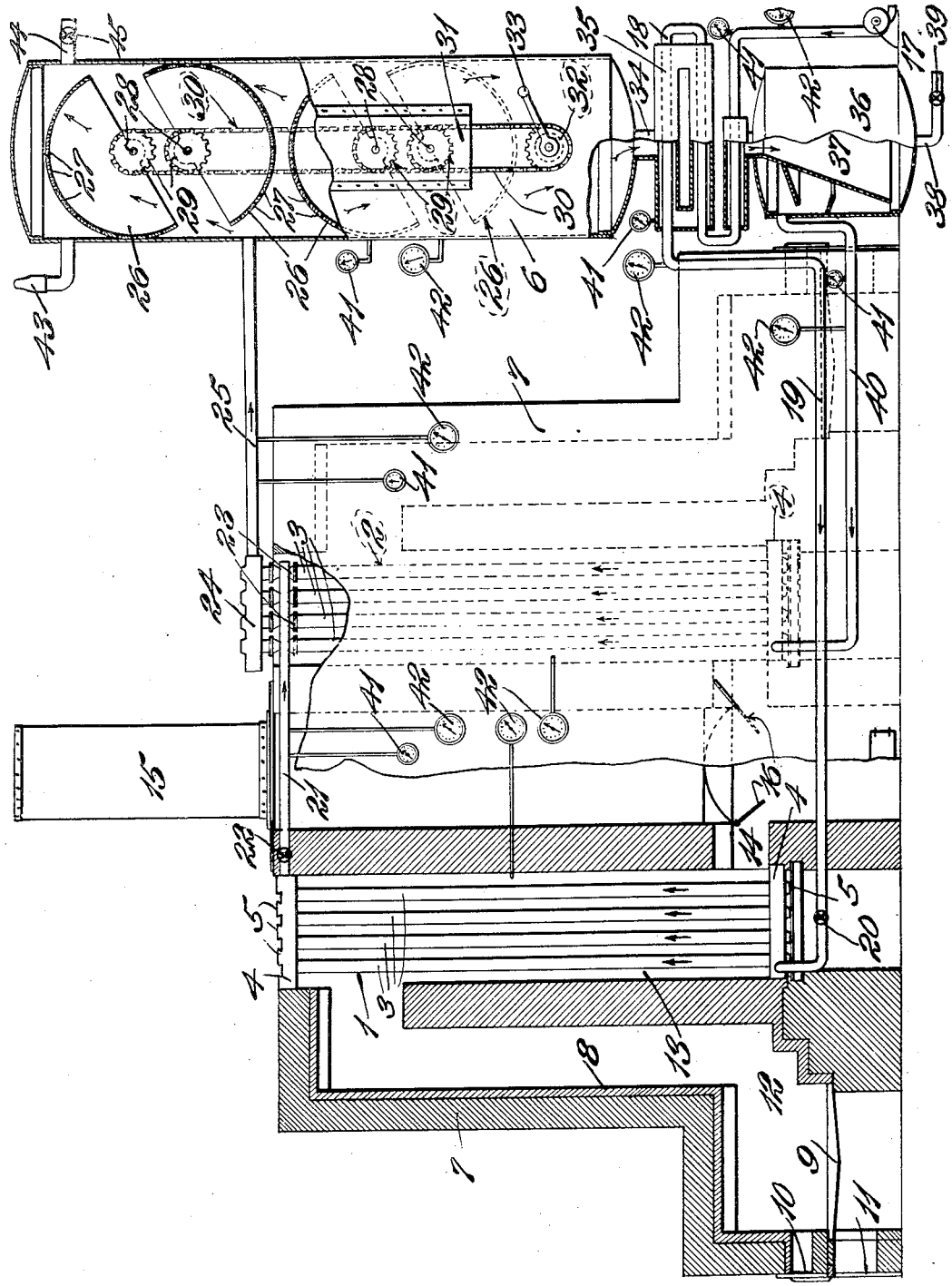

Patented Aug. 23, 1927.

1,640,223

UNITED STATES PATENT OFFICE.

ARTHUR D. SMITH AND JOHN PERL, OF ARKANSAS CITY, KANSAS.

PROCESS OF TREATING HEAVY HYDROCARBONS.

Application filed January 28, 1922. Serial No. 532,455. REISSUED

Our invention relates broadly to the production of low molecular weight hydrocarbons of commercial value from those of complex composition by the application of continuous recurrent cyclic distillation processes supplemented by intermediate continuous cyclic cooling and precipitation methods.

A primary object of our invention is the prevention of the formation of deleterious elementary carbon during the process of conversion. Many "cracking" processes have recognized the great danger incident to the deposition of carbon on tubes, pipes, or shell of still or conversion apparatus; clogging of circulation, excessive application of heat, and cessation of continuity of process being the inevitable results where physical deterrents are not employed. To eliminate the effects noted various methods have been suggested such as maintaining carbon in suspension by rapid circulation, prevention of deposition by mechanical scraping devices, the use of deposit trays, etc. In our process such methods are unnecessary in that the formation of carbon is practically entirely avoided by the continuous precipitation and removal of the yet soluble highly polymerized hydrocarbons from the reaction zone before their subsequent decomposition into free carbon or insoluble higher polymerized products. It is an object of this invention to precipitate and remove a sufficient portion of highly polymerized hydrocarbons to prevent saturation, precipitating at temperatures and pressures best suited for the particular complex undergoing conversion.

A further object of our invention is to effect precipitation of the polymerized hydrocarbons by continuously cooling a portion of the reacting medium before saturation occurs. It is a well-known fact that the pyrogenous distillation of complex petroleum distillates or residuals of high molecular weight produces under pressure a variety of products, from simple methane gas down through desirable low molecular weight hydrocarbons of commercial value as motor fuels, to highly polymerized bodies. The latter shortly undergo decomposition upon further application of heat into free carbon and gaseous products causing the operating difficulties previously mentioned. It is an object of this invention to provide a method for cooling a portion of the reacting medium continuously and produce a purely physical precipitation of the yet soluble polymerized bodies before saturation occurs with its immediately following pyrogenous precipitation and decomposition into free carbon and insoluble complexes.

A still further object of our invention is to effect the precipitation of the above mentioned polymerized bodies by the cooling action of the fresh oil pumped to the system through an exchanger in counter current course. The fresh oil during its passage is itself heated and while the heat absorbed will depend on precipitation temperature, itself a function of the pressure and reaction temperature best suited for the particular base involved, it is obvious a desirable heat interchange is always effected. An object of the invention is to effect an interchange of heat between the freshly charged oil and saturated partially converted base, while causing precipitation of the polymerized hydrocarbons.

Another object of our invention is an increase in total yield of desirable low molecular weight hydrocarbons over that obtained by a single distillation, by subjecting the fresh material and the stock that has undergone treatment separately to the respective temperatures and pressures best suited to obtain the desired objectives. It is an object of this invention to apply different temperatures and pressures to the fresh material and the treated stock respectively.

An additional object of our invention is a still further increase in total yield of desirable low molecular weight hydrocarbons obtained by uniting the separately heated raw material and partially converted base immediately prior to saturation of the former with polymerized bodies; dephlegmating the desirable gaseous low molecular weight hydrocarbons, and further "cracking" the residual liquid, passing same in thin films over conversion plates. An increased quantity of desirable low molecular weight hydrocarbons is thus obtained together with an additional amount of complex polymerized bodies; carbon formation being prevented during the lowering of temperature incident to "cracking" and evaporation, by the counteracting solvent action towards the complexes of the previously treated stock. It is an object of this invention to provide a method for allowing continuous cyclic admixture of fresh material and partially converted base at such a temperature as is best suited for the pressure and particular base product employed, with the objective of a maximum yield of desirable light hydrocarbons without formation of a saturated liquid medium.

Still another object of our invention is the prevention of carbon formation in the last "cracking" stage by controlling the interval of contact between the reacting liquid and the previously mentioned conversion plates. The liquid medium at this point is dangerously near saturation, and being highly reactive in thin films, destructive decomposition is likely to occur. It is an object of the invention to prevent destructive distillation to the extent of carbon formation by providing means for controlling the contact interval between the combined reacting liquid and the steel conversion plates.

A further object of our invention is the elimination in part of deleterious sulphur compounds by precipitation. Polymerization of these bodies occurs simultaneously with the hydrocarbons, and they may be precipitated by the same means as are employed to remove the latter. It is an object of the invention to eliminate highly polymerized sulphur compounds by precipitation, preventing thereby pyrogenous decomposition and entering of sulphur into combination with the metal of the heating coils or shell of still.

A further object of our invention is to convert the velocity of the raw liquid, produced by passage through constricted orifices to an eductor effect, utilizing the suction formed to circulate the partially converted base, uniting the liquids as previously described. It is an object of the invention to effect circulation of one portion of the liquid reacting medium by the high velocity discharge of another portion of the liquid, producing such velocity by forcing the second liquid through narrow orifices by pump pressure aided by the expansive action of external heat.

Prior to a detailed description of the process we wish to discuss the theory of certain reactions so that those familiar with the art of "cracking" may the more readily comprehend our application. In this connection we wish it distinctly understood that the absolute scientific accuracy of our theory is not so important as the resultant phenomena, the former being merely advanced as an explanation and not as absolute facts.

In any "cracking" process it would appear there is always a balance peculiar to the base, pressure, and temperature employed. If this balance be destroyed by removal of the low molecular weight hydrocarbons in the gaseous phase, and heat continued to be applied, a disturbance in balance of the liquid phase immediately results, additional molecules being converted into gaseous products and polymerized complexes. The latter bodies in their higher polymerized condition appear to be only moderately soluble in the reacting medium, a reduction in temperature causing a copious precipitation from a saturated solution. Analysis shows such precipitate to be slightly soluble in gasoline, but freely soluble in benzol, carbon bisulphide, and carbon tetrachloride; thus proving the existance of true hydrocarbons, which are of higher sulphur content than the original liquid and thus show the effect of polymerization.

If instead of precipitating the complex polymerized hydrocarbons from saturated solution, the application of heat be continued, the reacting medium then becomes supersaturated and pyrogenous precipitation of carbon occurs on the tubes, shell, or other heated surface of the apparatus, unless prevented by the more or less faulty mechanical means previously discussed. From the foregoing it is evident that the solubility of the various polymerized bodies is up to the saturation point, a function of temperature, and by cooling such reacting medium, precipitation can be effected in such parts of the apparatus as are desired apart from all heated surfaces.

The cooled residual liquid, dephlegmated from low boiling point hydrocarbons, contains in addition to unchanged heavy ends a large quantity of soluble complex hydrocarbons of progressive degrees of polymerization so that it is only natural to expect that the recycling of this product will require less heat and pressure than the original raw material. It is likewise reasonable to expect less saturation in the medium which has undergone a process of precipitation than in the raw material in equal cycles of conversion time, and if this assumption is correct a uniting of the two liquids prior to saturation of the raw product would produce a combined liquid capable of dissolving additional quantities of polymerized complexes. It will be noted this theory allows the additional "cracking" that takes place after dephlegmation without formation of carbon. It is likewise apparent that the probable catalytic action of the steel conversion plates towards the reacting liquid with the attendant danger of forming a super-saturated solution can be modified by controlling the contact interval. It is entirely probable, however, that the actual reactions involved are far more complex than the explanation cited. We therefore do not limit ourselves to any one theory. nor do we attempt a full explanation of the apparently involved phenomena, neither do we limit our process to the separate handling of two liquids only, substituting multiple distillations and coolings where advisable.

Other advantages and objects of our invention will appear hereinafter.

In order to more clearly present our invention, reference is made to the accompanying drawing in which:—

The drawing represents in part a vertical section and in part a vertical elevation of one form of apparatus, essentially diagrammatic in nature, for carrying out the conversion of hydrocarbon oils without the formation of elementary carbon.

In the apparatus disclosed in the drawing, we employ two sets of heating coils 1 and 2, provided with as many tubes 3 as may be convenient, expanded into the headers 4, equipped with key caps 5; also one vertical still 6. It is not however the purpose of the invention to limit the process to this arrangement, multiple effects being installed when desirable. Each heating coil, 1 and 2, is set in a typical down draft furnace 7, lined with fire brick 8, and equipped with grate 9, fire door 10, ash pit door 11, combustion chamber 12, heating chamber 13, and down flue 14, which is connected with a common stack 15. Damper controls are maintained at 16.

The heating coil 1 is supplied with raw oil by the three stage centrifugal pump 17, discharging through the cooling coil 18, and thence to the heating coil proper by the feeder pipe 19, control being effected by the valve 20. The partially converted oil leaves the primary heating coil 1 through the pipe 21, and controlled by the valve 22, passes through a series of eductors 23, into the header 24. From thence the united stream passes through pipe 25 to the vertical still 6, where dephlegmation of the gaseous products is effected and further " cracking " developed. This phase of the process is aided by the hemi-spherical conversion plates 26, which are provided with perforations 27, and are mounted on parallel shafts 28, set in a horizontal plane one above the other. The shafts 28 are provided with sprockets 29, and connecting chain 30. Where interference to rotation would occur, the sprockets are set outside of the shell proper, and are enclosed in the offset receptacle 31. The bottom shaft of the conversion plates, which may be of any convenient number, is attached to an elongated shaft passing through the stuffing box 32, and provided with a crank 33 for turning the plates at any desired angle. It will be noted in this connection that the latter may be turned in a horizontal plane so as to completely close the cross section of the still except for the perforations in the plates previously mentioned, or they may be set at an angle as shown in the drawing as desired; thus, affording the maximum obstruction to flow of gases or liquid, or only 50 per cent impedance as may be desired. In the latter instance it will be noted however that on account of the hemi-spherical type of construction, that, whatever the angle, one side of the plate will offer resistence to flow, causing the gases or liquid to take a zig-zag course.

At the base of the vertical still 6 is the outlet pipe 34, which is preferably of large size, connecting the counter current jacket 35, surrounding the cooling coil 18. The cooled liquid descends to the precipitation chamber 36 through the funnel shaped cone 37, the complex polymerized semi-solid asphaltic tars being drawn off through the waste line 38, controlled by the valve 39. The de-saturated, cooled and partially converted liquid to be re-cycled passes through the return pipe 40 to the second heating coil 2, whence it is educted and united with the stream from the primary coil 1 and discharged through the pipe 25 to the vertical still 6, thus completing the cycle of operations.

The various heating elements are provided with standard pressure gauges 41, and recording thermometers 42. The vertical still proper is equipped with a pop safety valve 43 and vapor outlet line 44, controlled by the valve 45, from which the line passes to any standard form of condenser not shown in the illustration.

In the actual operation of the process, the rate of delivery from the three stage centrifugal pump may be regulated so as to produce in combination with the heat applied to the primary coil a pressure say of three hundred pounds to the square inch prior to entrance of eductors; a temperature of 850° F. being previously determined by experiment as the best " cracking " temperature for the particular base to be converted, it being understood that these values are typical and not absolute.

The orifices in the eductors may be designed, for example, so that the oil traveling at the velocity incident to the 300 lbs. initial pressure will in its suction effect be reduced to 100 lbs. pressure. The secondary heating coil and the vertical still would therefore be maintained at approximately this pressure by the proper manipulation of control valves, maintaining, say, a temperature of 700° F. in the secondary coil, and a somewhat higher figure in the combined issuing stream, due to the influence of the superheated raw product.

The maximum yield of desirable molecular weight hydrocarbons will be obviously proportional to the extent of " cracking," this being evidently the highest with the longest contact of the reacting phases in thin films during passage over the hemi-spherical conversion plates when set to expose the greatest obstruction to flow (maximum surface). By testing from time to time the precipitate produced by the action of the cooling oil, any approach to saturation and pyrogenous decomposition can be detected by solubility in benzol, carbon tetrachloride or other proper solvent; the conversion plates being then adjusted to decrease the contact interval and thus overcome such tendency. When such manipulation does not suffice it is evident "cracking" is proceeding too rapidly in the heating coils, and the speed of flow must be increased or the intensity of firing reduced as occasion demands.

In precipitating the polymerized complexes, a maximum cooling effect is desirable to the extent of possibly requiring an additional amount of cooling oil over that that can be processed in one set of primary and secondary heating coils. Such a difficulty is overcome in practice by manifolding the cooling lines of several conversion sets, so that an extra amount of cooling oil may be diverted when necessary. Other modifications of arrangement suggest themselves such as further economy in fuel obtained by passing the raw product, partially heated to the reaction temperature when cooling the saturated partially converted base, through an additional set of coils located in the current of waste heat gases prior to entrance to stack. In short while the apparatus mentioned is highly suitable for carrying out the process as described, we do not limit ourselves to such form, our process claims being equally applicable to any apparatus effecting the same results in the manner described.

What we claim is:

1. The process of converting heavy hydrocarbon oils into low molecular weight hydrocarbons which consists in cracking the heavy hydrocarbons partly into light gaseous hydrocarbons and partly into semi-liquid polymerized hydrocarbons soluble in the partially converted stock, eliminating said gaseous products and then precipitating and eliminating a portion of such polymerized hydrocarbons, said operations being effected while the stock is continuously circulated through a zone of heat and pressure sufficient for said cracking operation and thence through a zone of sufficiently low temperature to precipitate such portion of said polymerized hydrocarbons, and thence back to a second zone of heat, fresh stock being added to the treated portion from which said polymerized hydrocarbons have been precipitated after such portion reaches said second zone of heat.

2. The process of converting heavy hydrocarbon oils into low molecular weight hydrocarbons which consists in cracking the heavy hydrocarbons partly into light gaseous hydrocarbons of low molecular weight and low sulphur content, and partly into semi-liquid polymerized hydrocarbons of high sulphur content soluble in the partially converted stock, eliminating said gaseous products and then precipitating and eliminating a portion of such polymerized hydrocarbons, said operations being effected while the stock is continuously circulated through a zone of heat and pressure sufficient for said cracking operation and thence through a zone of sufficiently low temperature to precipitate a portion of said polymerized hydrocarbons, and thence back to a second zone of heat, fresh stock being added to the treated portion from which said polymerized hydrocarbons have been precipitated after such portion reaches said second zone of heat.

3. The process of converting heavy hydrocarbon oils into low molecular weight hydrocarbons without formation of carbon, which consists in the continuous cyclic conversion of the heavy hydrocarbon oils by the application of external heat while under pressure partly into light gaseous hydrocarbons of low molecular weight and partly into semi-liquid highly polymerized complex hydrocarbons soluble in the partially converted stock continuously eliminating said light hydrocarbons continuously precipitating a sufficient quantity of said polymerized complex hydrocarbons to prevent saturation of said stock by continuously cooling said stock after exposure to said heat and pressure to a temperature suited for the particular base and pressure employed and then reheating the treated stock and adding it to the heated fresh stock.

4. The process of converting heavy hydrocarbon oils into low molecular weight hydrocarbons which consists in the continuous cyclic conversion of the heavy hydrocarbon oils by the application of external heat while under pressure, partly into light gaseous hydrocarbons of low molecular weight and low sulphur content, and partly into semi-liquid highly polymerized complex hydrocarbon of high sulphur content soluble in the partially converted stock, continuously eliminating said light hydrocarbons continuously precipitating a sufficient quantity of said polymerized complex hydrocarbons of high sulphur content to prevent saturation of said stock, by continuously cooling said stock after exposure to said heat and pressure to a temperature suited for the particular base and pressure employed and then reheating the treated stock and adding it to the heated fresh stock.

5. The process of converting heavy hydrocarbon oils into low molecular weight hydrocarbons without formation of carbon which consists in the continuous cyclic conversion of the heavy hydrocarbon oils by the application of external heat while under pressure, partly into light gaseous hydrocarbons of low molecular weight and partly into semi-liquid highly polymerized complex hydrocarbons soluble in the partially converted oils, cooling and precipitating said polymerized complex hydrocarbons, effecting such cooling with partial interchange of heat by continuously passing fresh raw oil through said partially converted oils in a suitable form of exchanger, and reheating the partially converted oils minus the gaseous and precipitated matter and adding such reheated oils to the heated fresh oil.

6. The process of converting heavy hydrocarbon oils into low molecular weight hydrocarbons without formation of carbon, which consists in the continuous cyclic conversion of the heavy hydrocarbon oils divided into portions, by the application of selective heats and pressures suited for the portions employed, converting said portions partly into light gaseous hydrocarbons of low molecular weight and partly into semi-liquid highly polymerized complex hydrocarbons soluble in the partially converted oils, uniting said portions prior to saturation with the said polymerized hydrocarbons, eliminating said light hydrocarbons and then continuously precipitating a quantity of said polymerized hydrocarbons from said partially converted oils and then returning the latter for the action of heat and pressure.

7. The process of converting heavy hydrocarbon oils into low molecular weight hydrocarbons without formation of carbon, which consists in the continuous cyclic conversion of the heavy hydrocarbon oils divided into raw base and partially converted liquid stock, by the application of selective heats and pressures suited for the divisions employed, converting said raw base and said partially converted stock partly into light gaseous hydrocarbons of low molecular weight and partly into semi-liquid highly polymerized complex hydrocarbons soluble in the resultant further converted stock, uniting said heated raw base and partially converted stock prior to saturation with said polymerized complexes, eliminating the light hydrocarbons, continuously precipitating from such united stocks a sufficient quantity of said polymerized complexes to prevent saturation of said united stocks and returning such stocks into the circulation for repetition of the action.

8. The process of converting heavy hydrocarbon oils into low molecular weight hydrocarbons without formation of carbon, which consists in the continuous cyclic conversion of the heavy hydrocarbon oils divided into raw stock and treated stock, converting said raw stock and said treated stock into light gaseous hydrocarbons and semi-liquid polymerized complex hydrocarbons, uniting said stocks prior to saturation with said polymerized hydrocarbons, dephlegmating said light gaseous hydrocarbons produced, further "cracking" the residual stocks into additional quantities of light gaseous low molecular weight hydrocarbons and semi-liquid highly polymerized complex hydrocarbons soluble in the resultant stock, effecting such "cracking" by passage of the reacting stock in thin films over conversion plates of adjustable contact surface, and continuously precipitating and eliminating from such treated stock a quantity of said polymerized hydrocarbons prior to the return of such treated stock for repetition of the action.

9. The process of converting heavy hydrocarbon oils into low molecular weight hydrocarbons without formation of carbon, which consists in the continuous cyclic conversion of the heavy hydrocarbon oils divided into parts, by the application of selective heats and pressures, converting said parts into light gaseous hydrocarbons of low molecular weight and semi-liquid highly polymerized complex soluble hydrocarbons, mechanically effecting circulation of one part and effecting circulation and admixture therewith of another part of the reacting liquids after partial conversion by utilizing the velocity of the liquid discharge of such mechanically circulated part in eductor effect, uniting said parts prior to saturation with the said polymerized complexes, dephlegmating the low molecular weight gaseous hydrocarbons produced, further "cracking" the residual medium, precipitating therefrom a sufficient quantity of polymerized complexes to prevent saturation with attendant pyrogenous precipitation of carbon, and returning the medium to the process in continuous cyclic course.

Signed at Arkansas City, Kans., this 11th day of January, 1922.

ARTHUR D. SMITH.
JOHN PERL.